US008350678B1

(12) United States Patent
Xiong et al.

(10) Patent No.: US 8,350,678 B1
(45) Date of Patent: Jan. 8, 2013

(54) POWER LINE DIMMING CONTROLLER AND RECEIVER

(75) Inventors: Wei Xiong, Madison, AL (US); Christopher Radzinski, Huntsville, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 987 days.

(21) Appl. No.: 12/394,761

(22) Filed: Feb. 27, 2009

Related U.S. Application Data

(60) Provisional application No. 61/034,001, filed on Mar. 5, 2008.

(51) Int. Cl.
*G05B 11/01* (2006.01)

(52) U.S. Cl. ................ 340/12.33; 340/12.31; 340/12.32

(58) Field of Classification Search ............... 340/12.22, 340/12.31, 12.32, 12.33, 12.34, 12.35, 12.36, 340/12.37, 12.38, 13.1, 13.21, 13.22
See application file for complete search history.

(56) References Cited

U.S. PATENT DOCUMENTS

| | | | | |
|---|---|---|---|---|
| 3,488,517 | A | 1/1970 | Cowan et al. | |
| 3,525,078 | A | 8/1970 | Baggott | |
| 3,594,584 | A | 7/1971 | Woods | |
| 3,714,451 | A | 1/1973 | Whitney et al. | |
| 3,721,830 | A | 3/1973 | Oishi et al. | |
| 3,818,466 | A | 6/1974 | Honda | |
| 3,986,121 | A * | 10/1976 | Oehrli | 340/12.33 |
| 4,254,403 | A | 3/1981 | Perez-Cavero et al. | |
| 4,348,582 | A | 9/1982 | Budek | |
| 4,400,688 | A | 8/1983 | Johnston et al. | |
| 4,408,185 | A | 10/1983 | Rasmussen | |
| 4,523,128 | A | 6/1985 | Stamm et al. | |
| 4,704,563 | A | 11/1987 | Hussey | |
| 5,068,576 | A | 11/1991 | Hu et al. | |
| 5,227,762 | A | 7/1993 | Guidette et al. | |
| 5,471,119 | A | 11/1995 | Ranganath et al. | |
| 5,475,360 | A | 12/1995 | Guidette et al. | |
| 5,691,691 | A | 11/1997 | Merwin et al. | |
| 6,225,759 | B1 * | 5/2001 | Bogdan et al. | 315/291 |
| 6,388,399 | B1 | 5/2002 | Eckel et al. | |
| 6,734,784 | B1 | 5/2004 | Lester | |
| 2006/0038661 | A1 * | 2/2006 | Reinhold et al. | 340/310.11 |
| 2008/0258882 | A1 * | 10/2008 | Lester et al. | 340/310.12 |

* cited by examiner

*Primary Examiner* — Nabil Syed

(74) *Attorney, Agent, or Firm* — Waddey & Patterson, P.C.; Mark J. Patterson

(57) ABSTRACT

A power line communication system transmits a dimming level to an electronic ballast to regulate the power consumed by a lamp. The power line controller has a notch generation circuit that generates notches on an AC power signal with a time duration in accordance with the dimming level of the lamp. A dimming interface associated with the electronic ballast detects the notches on the AC power signal. The dimming interface generates a ballast dimming level signal with a signal level related to the time duration of these notches.

17 Claims, 6 Drawing Sheets

POWER LINE DIMMING CONTROLLER AND RECEIVER

CROSS-REFERENCES TO RELATED APPLICATIONS

This application is a Non-Provisional Utility application which claims the benefit of U.S. Patent Application Ser. No. 61/034,001 filed Mar. 5, 2008, entitled "Power Line Dimming Controller and Receiver" which is hereby incorporated by reference.

BACKGROUND OF THE INVENTION

The present invention relates generally to a power line communication system for an electronic ballast. More particularly, the invention relates to a power line communication system that communicates a dimming level to an electronic ballast.

As is known in the art, electronic ballasts are utilized to generate and control the amount of power consumed by gas discharge lamps. The dimming level determines the power output of the electronic ballast and therefore the lighting intensity of the lamp. This dimming level may be communicated to a dimming interface associated with the electronic ballast. The dimming interface receives a signal having dimming level information and generates a ballast dimming level signal in accordance with the communicated dimming level information. The dimming interface signal then causes the electronic ballast to operate at a particular dimming level. In this manner, a user can control the power consumed by the lamp.

Often, it is advantageous to communicate the lamp dimming level over the AC power signal that powers the electronic ballast. A power line controller is utilized to create disturbances on the AC power signal to communicate the dimming level to the electronic ballast. These disturbances are often termed notches and may be generated at a predetermined phase angle on the AC power signal, such as a zero-crossing. A power line controller creates these notches on the AC power signal by opening or closing the transmission lines.

A dimming interface associated with the electronic ballast receives the AC power signal after the power line controller has created the notches on the AC power signal. The dimming interface translates these notches into a ballast dimming level signal that corresponds to the desired dimming level of the ballast. Translating these notches involves detecting the presence or absence of the notches to determine the data bit values being transmitted to the dimming interface. For example, the presence of a notch at the zero crossing of the AC power signal may represent a "one" while the absence of a notch at the zero crossing of the AC power signal may represent a "zero". Upon receiving these data bits, the dimming interface groups these into a bit word that represents the dimming level and creates the ballast dimming level signal.

Unfortunately, prior art communication systems require expensive components, such as processors and digital-to-analog converters, to convert the word of bits into a ballast dimming level signal. Also, because the prior art systems represent the dimming level in a digital bit word, the communication system can only represent a discrete number of dimming levels. The number of dimming levels of the lamp is therefore limited by the size of the bit word. An inherent limitation of this type of communication system is thus the frequency of the AC power signal. For example, because the notches are generally placed on the zero crossings of the AC power signal, a 120 Hz AC power signal has a transmission rate of either 120 Hz per second of both the negative and positive zero crossing are used and 60 Hz if only one zero crossing is used. Consequently, the transmission time for the dimming level increases as the number of dimming levels increases.

What is needed, then, is a communication system that does not need to translate a word of bits to generate a ballast dimming level signal.

BRIEF SUMMARY OF THE INVENTION

The communication system of the present invention has a power line controller and a dimming interface that are connectable to AC power lines transmitting an AC power signal to the electronic ballast. The power line controller generates notches on the AC power signal while the dimming interface translates these notches into a dimming level signal for the electronic ballast. The signal level of the dimming level signal is determined according to the time duration of the notches generated by the power line controller. The ballast dimming level signal is then utilized to adjust the electronic ballast to the desired ballast dimming level and thereby produce the desired power output to the lamp.

The power line controller has the ability to control the time duration of the notches in the AC power signal. To accomplish this, the power line controller has a notch generating circuit that generates notches on the AC power signal by opening or closing a switch. In one embodiment, the notch generating circuit is configured so that opening the switch creates the notch at or near the zero-crossing of only one of the half-cycles of the AC power signal. Biased components are included on parallel circuit segments connected to one of the AC input lines. Each biased component may be biased to transmit the opposite half-cycle of the AC power signal. Consequently, one circuit segment transmits the positive half-cycle of the AC power signal while the other circuit segment transmits the negative half-cycle of the AC power signal. The switch is connected to one of these circuit segments and thus the notch is created on only one of the half-cycles of the AC power signal.

The power line controller also has a switch control circuit coupled to the switch and a reference signal circuit that generates an adjustable reference signal. The switch control circuit causes the opening and closing of the switch and may be coupled to the AC power lines to receive a notch duration signal that is associated with the AC power signal. This switch control circuit senses when the signal level of the notch duration signal has a predetermined relationship with the signal level of the reference signal. The amount of time that this predetermined relationship exists is associated with the amount of time that the switch is either open or closed to create the notch. Thus, the time duration of the notch is related to the time duration of the predetermined relationship. Adjusting the level of the reference signal thereby adjusts the amount of time that the predetermined relationship exists between the signals. Consequently, the time duration of the notches is changed by adjusting the level of the reference signal.

The dimming interface translates the time duration of these notches into the ballast dimming level signal for controlling the electronic ballast. The dimming interface receives a dimming interface input signal associated with the AC power signal having the notches. A pulse generation circuit in the dimming interface then generates pulses having a pulse duration associated with the time duration of the notches and transmits the pulses to a ballast dimming level generation circuit. The ballast dimming level generation circuit is functional to set the signal level of the ballast dimming level signal in accordance with a relationship between the pulse duration of the pulses and a period of the periodic pulse signal. Consequently, the signal level of the ballast dimming level signal is adjusted whenever the time duration of the notches is adjusted because the signal level of the ballast dimming level signal is related to the pulse duration of the pulses. Because the dimming level is determined in accordance with the time duration of the notches and not by a word of bits, this configuration eliminates the need for expensive and complicated digital hardware previously required to communicate the dimming level of the electronic ballast.

Figure 3:
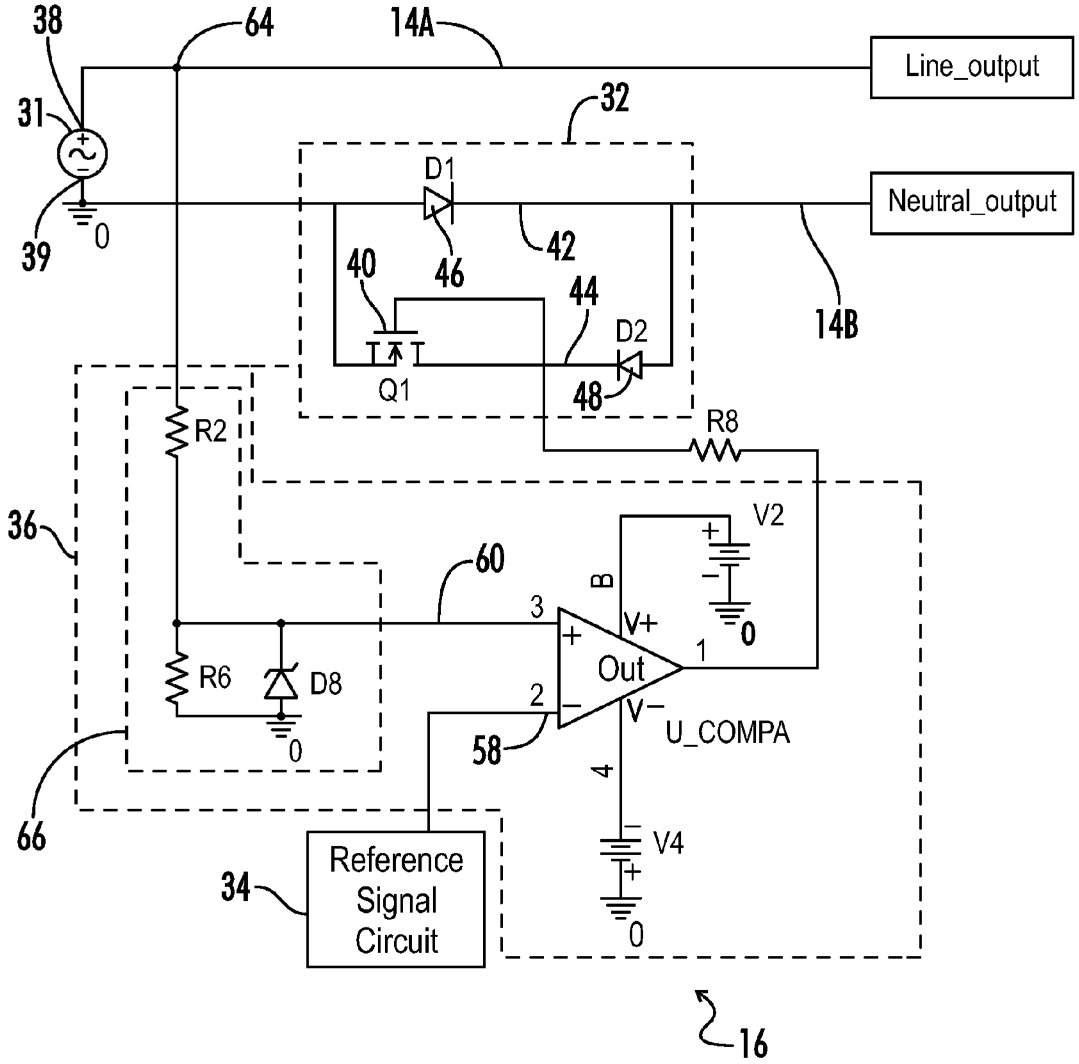
FIG. 3 is a schematic of one embodiment of the power line controller for the communication system.

Graph A is a representation of the AC power signal generated by the AC source and transmitted along the AC power lines by the power line controller shown in FIG. 3.

Graph B is a representation of a notch generation signal for the power line controller shown in FIG. 3.

Graph C is a representation of a switch control signal for the power line controller shown in FIG. 3.

Graph D is a representation of the AC power signal having notches generated by the power line controller shown in FIG. 3.

Figure 5:
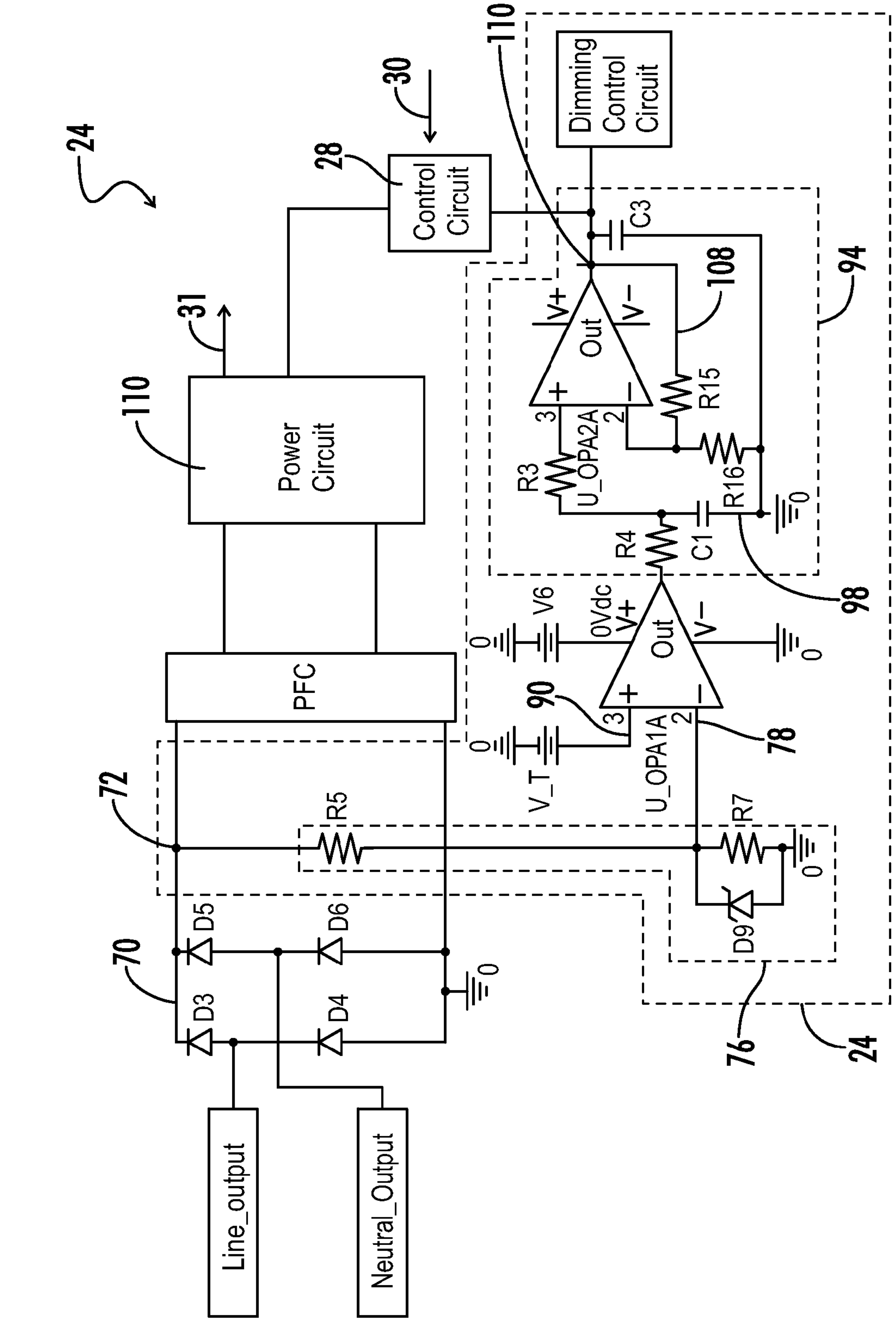

FIG. 5 is a schematic of one embodiment of the dimming interface for the communication system.

Figure 6:
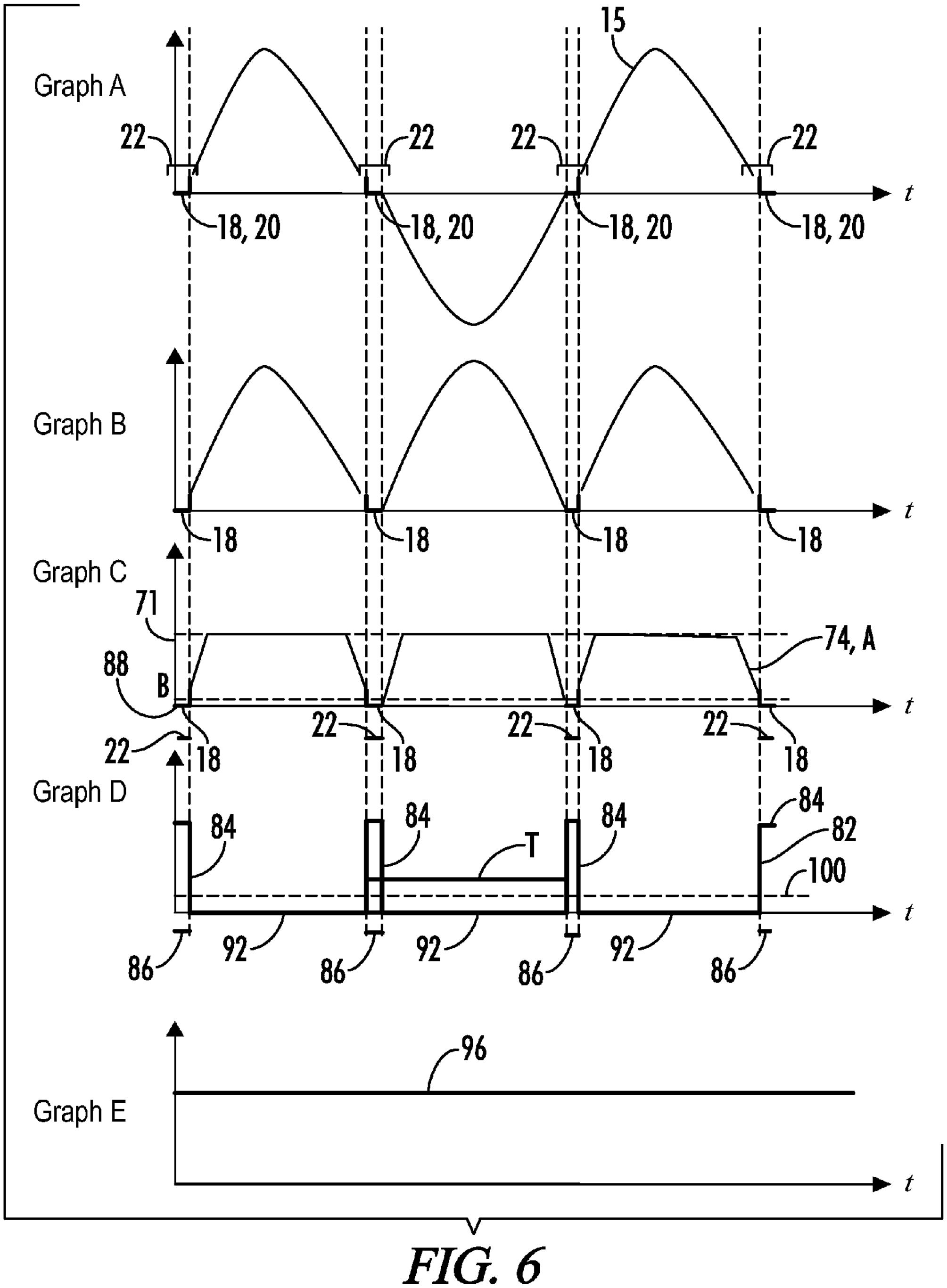

FIG. 6 is an illustration showing five graphs displaying the relevant signals associated with the dimming interface shown in FIG. 5. The dotted lines on and between the graphs demonstrate the relevant relationships between the signal levels of the signals illustrated by the five graphs. The following graphs are illustrated in FIG. 6:

Graph A is a visual illustration of the AC power signal having notches generated by the power line controller.

Graph B is a visual illustration of the AC power signal illustrated in Graph A of FIG. 5 after the AC power signal has been rectified into a rectified AC power signal.

Graph C is a visual illustration of a dimming interface input signal for the dimming interface shown in FIG. 5.

Graph D is a visual illustration of pulses generated by a pulse generation circuit in the dimming interface shown in FIG. 5.

Graph E is a visual illustration of the ballast dimming level signal generated by the dimming interface shown in FIG. 5.

DETAILED DESCRIPTION OF THE INVENTION

Figure 1:
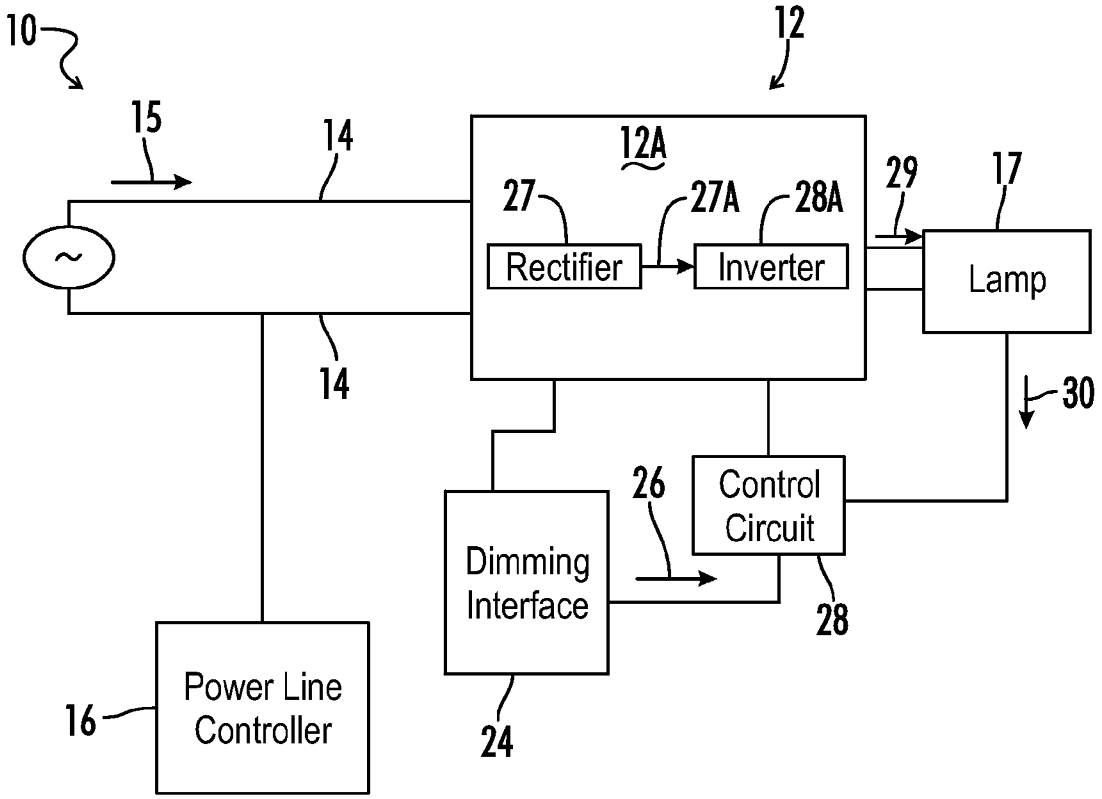
FIG. 1 is a block diagram of one embodiment of the power line communication system.

Referring to FIGS. 1 and 6, the power line communication system 10 communicates a dimming level to an electronic ballast 12 with a power circuit 12A. This dimming level is communicated to the electronic ballast 12 along AC power lines 14 for transmitting an AC power signal 15 for powering the electronic ballast 12. This electronic ballast 12 is then coupled to a lamp 17 that provides lighting. The lamp 17 may be any type of lamp that utilizes an electronic ballast, including a gas-discharge lamp. The power output of the lamp 17 is determined according to the dimming level communicated by the power line communication system 10 to the electronic ballast 12.

To communicate the dimming level, the power line communication system 10 has a power line controller 16 that generates notches 18 on the AC power signal 15. The power line controller 16 may be connected to at least one of the AC power lines 14 so that the power line controller 16 can sense the phase or amplitude of the AC power signal 15. In this manner, the notches 18 can be placed at a predetermined location along the period 19 of the AC power signal 15. For example, in the embodiment illustrated in FIG. 1, the notches 18 are generated at or near the zero crossings 20 of the AC power signal 15. The power line controller 16 is also capable of adjusting the time duration 22 of these notches 18 so that the time duration 22 represents a particular dimming level of the electronic ballast 12.

The power line communication system 10 also has a dimming interface 24 operably coupled to the electronic ballast 12. The dimming interface 24 may be a part of the electronic ballast 12 or may be a separate circuit that communicates a dimming level signal 26 to a control circuit 28 controlling the power output of the AC lamp signal 29 generated by the electronic ballast 12. The dimming interface 24 also may be coupled to one of the AC power lines 14 to receive the AC power signal 15 with the notches 18. The dimming interface 24 translates the time duration 22 of the notches 18 on the AC power signal 15 into a signal level for the dimming level signal 26. Accordingly, the dimming level of the electronic ballast 12 is communicated without having to translate a bit word. Consequently, all of the components required to translate digital signals are not necessary in power line communication system 10. Significant cost savings over previous power line communication system designs are realized by eliminating the need for these components.

One type of electronic ballast 12 that may be utilized with the communication system 10 operates by receiving the AC power signal 15 and having the dimming interface 24 generate the dimming level signal 26 in accordance with the time duration 22 of the notches. The power circuit 12A of the electronic ballast 12 has a rectifier 27 that rectifies the AC power signal 15 into a DC power signal 27A and an inverter 28A that generates an AC lamp signal 29 to power the lamp 17. To control the power level of AC lamp signal 29, the electronic ballast 12 controls the switch frequency of the inverter 28A in accordance with the signal level of the DC power signal 27A. Generally, control circuits 28 operate by receiving a feedback signal 30 associated with the power consumed by the lamp 17 and the dimming level signal 26 from the dimming interface 24. The control circuit 28 then compares the feedback signal 30 and the dimming level signal 26 to sense if the electronic ballast 12 is producing the desired power output to the lamp 17. If the electronic ballast 12 is not producing the desired power output, adjustments are made to the switch frequency of the inverter 26. Consequently, a change in the signal level of the dimming level signal 26 in turn causes the control circuit 28 to adjust the power output to the lamp 17. Because an adjustment to the time duration 22 of the notches 18 causes a change in the signal level of the dimming level signal 26, the time duration 22 of the notches 18 determines the power output to the lamp 17.

It should be understood that the communication system described in this disclosure is not limited to the electronic ballast design described above. This electronic ballast is merely an example of a circuit that may utilize the communication system described. In fact, the communication system in this disclosure can be utilized with any circuit that requires a dimming level signal to generate a power signal to a lamp.

Figure 4:
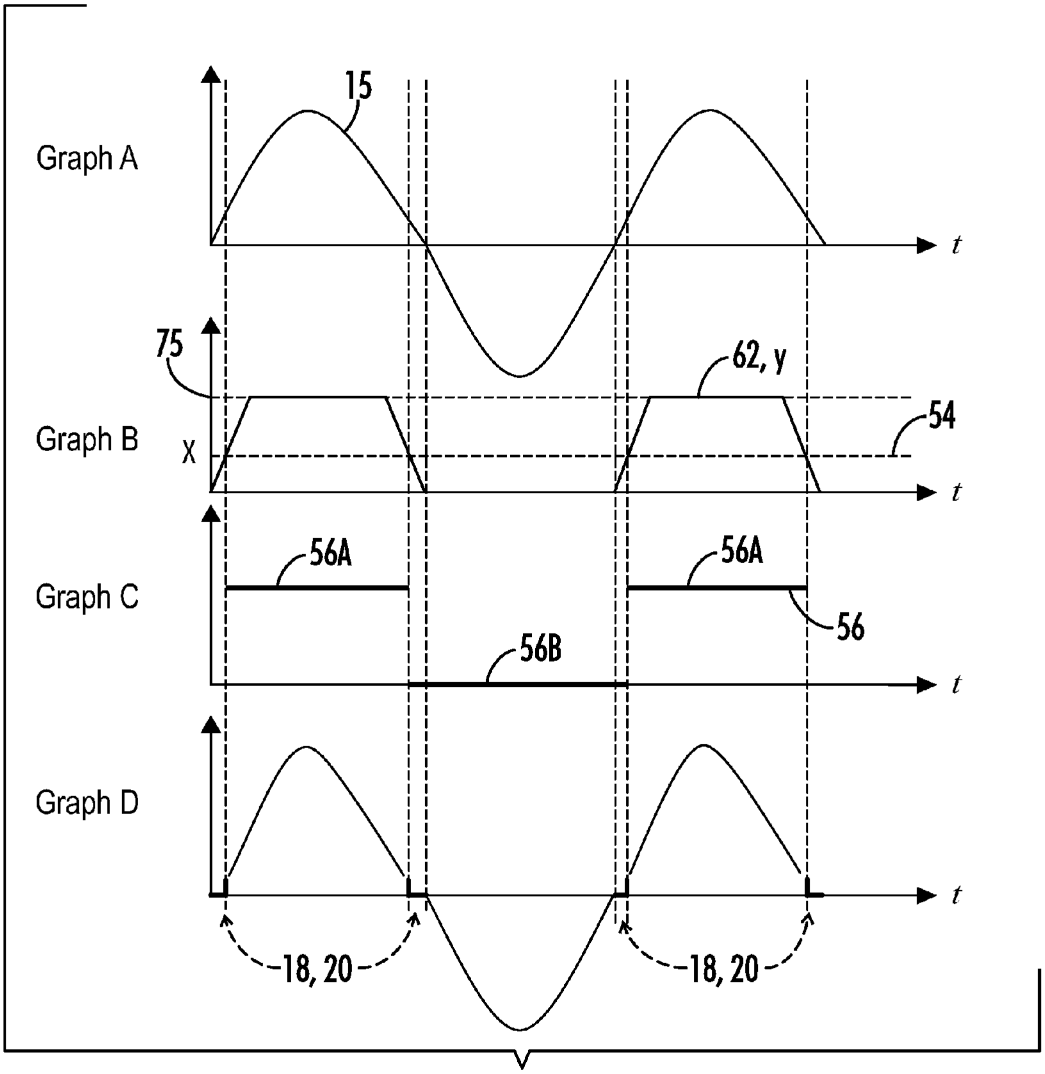
FIG. 4 shows four graphs displaying the relevant signals associated with the power line controller shown in FIG. 3. The dotted lines on and between the graphs demonstrate the relevant relationships between the signal levels of the signals illustrated by the four graphs. The following graphs are illustrated 4.

Referring now to FIGS. 3 and 4, the components and operation of one embodiment of the power line controller 16 are shown and described. Transmission lines 14A, 14B transmit the AC power signal 15 shown in Graph A from an AC power source 31. In this embodiment, one of the transmission lines 14A is connected to the positive terminal 38 of the AC power source 31 and is labeled Line_output. The other transmission line 14B is connected to the negative terminal 39 of the AC source 31 and is labeled Neutral_output because the line is grounded. The power line controller 16 may have a notch generating circuit 32 connected to the transmission line 14B to generate notches 18 on the AC power signal 15. A reference signal circuit 34 and a switch control circuit 36 are utilized to control the notch generating circuit 32 and to sense when to generate the notches 18 on the AC power signal 15. The illustrated embodiment generates these notches 18 at the zero-crossings 20 of the AC power signal 15, as shown in Graph D of FIG. 4. Generating notches 18 at the zero crossings 20 of the AC power signal 15 reduces the harmonic distortion in the circuit and provides stability to the signal.

The notch generating circuit 32 creates the notches 18 in the AC power signal 15 by opening a switch 40 connected to AC input line 14B. In the described embodiment, the notch generating circuit 32 generates the notches 18 on only either the positive or the negative half-cycle of the AC power signal 15. This is because notch generating circuit 32 is arranged with parallel circuit segments 42, 44 each having a biased components 46, 48. Each parallel circuit segment 42, 44 is arranged to only transmit either the positive or negative half-cycle of the AC power signal 15. Biased component 46 is a forward-biased diode. Because the notch generating circuit 32 is connected to the Neutral_output transmission line 14B, the biased component 46 allows the transmission of the negative half-cycle of the AC power signal 15. On the other circuit segment 44, the biased component 48 is a reverse-biased diode in series with the switch 40. Consequently, each half-cycle of the AC power signal is transmitted through only one of the parallel circuit segments 46, 48. Thus, opening the switch 40 can only generate a notch 18 on the half cycle transmitted by the circuit segment 42, 44 with the switch 40.

Because the notch generating circuit 32 is connected to the Neutral_output transmission line 14B, the reverse-biased component 48 transmits the positive half-cycle of the AC power signal 15. Thus, the notches 18 are generated only on the positive half-cycle of the AC power signal 15. To generate notches 18 on the negative half-cycle, the polarity of the biased components 46, 48 can be reversed or the notch generating circuit 32 can be placed on the Line_output transmission line 14A. By manipulating the polarity of the biased components 46, 48 and the transmission line 14A, 14B on which the notch generating circuit 32 is placed, the half-cycle of the AC power signal 15 with the notches 18 can be selected. However, generating a notch 18 on only one half-cycle of the AC power signal 15 may cause secondary harmonic distortion. Consequently, one should be aware of the limits for harmonic distortion placed by governing standards institutions, such as the American National Standards Institute (ANSI), when selecting particular components and component values for a particular application of the notch generating circuit 32.

Figure 2:
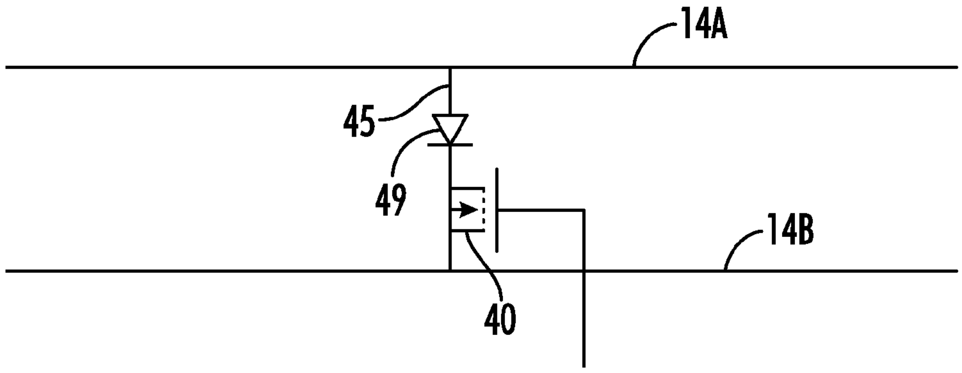
FIG. 2 is a schematic of one embodiment of a notch generating circuit in accordance with one aspect of the invention.

Another arrangement for generating a notch 18 on only one of the half-cycles is shown in FIG. 2. In this arrangement, a circuit segment 45 is connected between the transmission lines 14A, 14B. This circuit segment 45 has a biased component 49 and the switch 40. The biased component 49 is a forward biased diode that only permits the transmission of the positive half-cycle of the AC power signal 15. In this arrangement, the notch 18 is created by closing the switch 40. Once the switch 40 is closed, the positive half-cycle is shorted and a notch 18 is created on the AC power signal 31. By switching the polarity of the biased component 49, the notch 18 can be created on the negative half-cycle.

Figure 3A:
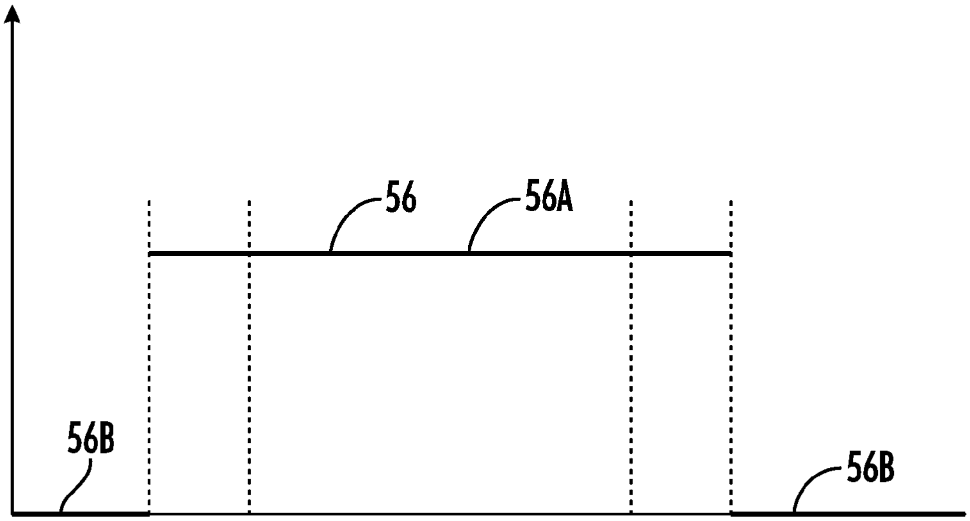
FIG. 3A is a graph of a switch control signal for the notch generating circuit.
Figure 3B:
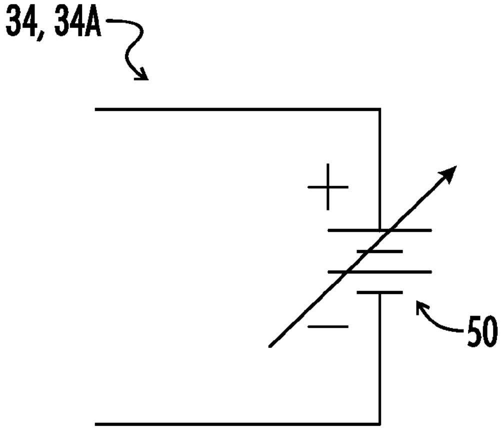
FIGS. 3B and 3C illustrate different embodiments of reference signal circuits.
Figure 3C:
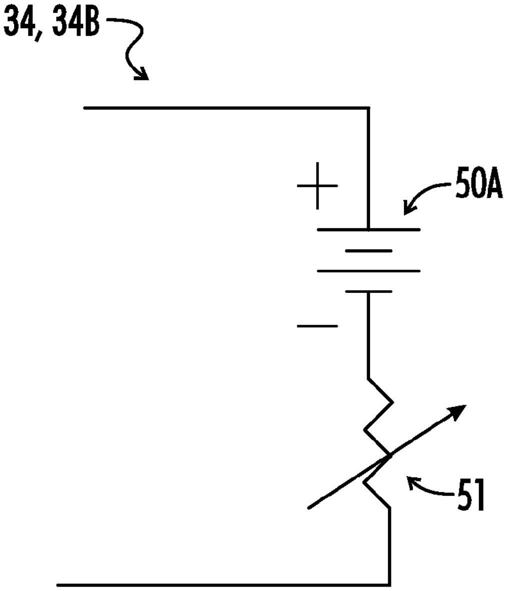

Referring again to FIGS. 3 and 4, sensing when to create the notch 18 on the AC power signal 15 is accomplished with the reference signal circuit 34 and the switch control circuit 36. The reference signal circuit 34 may be any circuit capable of varying the signal level of the reference signal generated by the circuit 34. In FIGS. 3B and 3C, two different embodiments of the reference signal production circuit 34 are shown. In the embodiment of FIG. 3B, the reference signal production circuit 34A is simply a variable DC source. In the embodiment of FIG. 3C, the reference signal circuit 34B has a DC source 50A connected to a variable resistor 51. By varying the resistance of the variable resistor 51, the signal level of the generated DC signal is varied. The reference signal 54 generated by these embodiments of the reference signal production circuit 34 is illustrated on Graph B of FIG. 4. The reference signal 54 is a DC signal with the value X.

This reference signal 54 is input into the switch control circuit 36. The switch control circuit 36 may generate a switch control signal 56 (shown in Graph C of FIG. 4) that opens and closes the switch 40. To accomplish this, the switch control circuit 36 has a reference signal input terminal 58 that receives the reference signal 54 and a notch duration input terminal 60 for receiving a notch duration signal 62. The notch duration signal 62 is shown in Graph B of FIG. 4. The switch control circuit 36 senses when the signal level of the notch duration signal 62 has a predetermined relationship with the signal level of the reference signal 54. The value of the signal level of the notch duration signal 62 is represented by the value Y. The notch duration signal 62 is associated with the AC power signal 15 and may be the AC power signal 15 itself. The period of the notch duration signal 62 ($T_{nds}$) should bear some relationship to the period of the AC power signal 15 ($T_{ps}$) if the notches 18 are to be placed at the same phase location or value on each cycle of the AC power signal 15. Consequently $T_{nds}=T_{ps}(t)$ where t represents a value of time.

The AC power signal 15 is theoretically a sinusoid that can be expressed as the function Am(t)*sin(b(t)*t). Therefore $T_{ps}(t)$ may equal 2*pi/b(t). The expression Am(t) represents the amplitude of the AC power signal 15 and the expression b(t) represents the frequency of the AC power signal, and are functions of time. In the illustrated scenario, both Am(t) and b(t) in Graph A of FIG. 4 are constant. The AC power signal 15 is thus equal to Am*sin(b*t) and $T_{ps}(t)$ is equal to 2*pi/b. In this embodiment, both the notch duration signal 62 and the AC power signal 15 have the same period.

To receive the notch duration signal 62, the switch control circuit 36 may have a switch control circuit input terminal 64 connected to the AC transmission line 14A to receive the AC power signal 15. While the AC power signal 15 itself may be used as the notch duration signal 62, the signal level may be too high for the sensing components in the switch control circuit 36. Therefore, a voltage regulation circuit 66 may be coupled between the switch control input terminal 64 and the notch duration input terminal 60 for regulating a peak level 61 of the notch duration signal 62. As illustrated in Graph B of FIG. 4, any part of the notch duration signal 62 that is greater than the peak level 61 is clipped by the voltage regulation circuit 66.

The voltage regulation circuit 66 may have a voltage divider which consists of resistors R2 and R6 to step down the signal level of the AC power signal 15. To assure that the notch duration signal 62 stays below the peak level 61, the voltage regulation circuit 66 has a reverse biased Zener diode D8 that conducts whenever the notch duration signal 66 is greater than the peak level 61. This clips the AC power signal 15 to produce the notch duration signal 62 in Graph B of FIG. 4.

The signal level of the reference signal 54 determines when to place the notches 18 on the AC power signal 15. In the embodiment shown in FIG. 3, the switch control circuit 34 has a comparator circuit U_COMPA for sensing when to place the notches 18 on the AC power signal 15. The comparator circuit U_COMPA generates the switch control signal 56 which in this embodiment is a pulsed signal shown in Graph C of FIG. 4. The switch 40 may be a transistor that has a gate that receives the switch control signal 56 to open and close the switch 40. Whenever the switch control signal 56 is high 56A, the switch 40 in closed and conducts the AC power signal 15. If the switch control signal 56 is low 56B the switch 40 is open and the AC power signal 15 cannot be conducted through the switch 40.

The signal level of the reference signal 54 also determines the time duration 22 of the notches 18 on the AC power signal 15. The comparator circuit U_COMPA compares the signal level of the reference signal 54 and the signal level of the notch duration signal 62. Whenever the value Y of the signal level of the notch duration signal 62 is greater than the value X of the signal level of the reference signal 54, the switch control signal 56 is high 56A. If the value Y of the signal level of the notch duration signal 62 is less than the value X of the signal level of the reference signal 54, the switch control signal 56 is low 56B and the AC power signal 15 cannot be conducted through the switch 40. By raising the signal level of the reference signal 54, the time duration 22 of the notch 18 is extended. In contrast, lowering the signal level of the reference signal 54, shortens the time duration 22 of the notches 18. As a result, the time duration 22 of the notches 18 can be controlled by adjusting the signal level of the reference signal 54.

Other predetermined relationships for controlling the state of the switch control signal 56 may also be utilized depending on the application of the communication system 10. For example, if the notches 18 are to be placed on the negative half-cycle of the AC power signal 15, then the value X of the reference signal 54 may be negative and the switch control signal 56 would be high 56A whenever the value Y of the signal level of the notch duration signal 62 is less than the value X of the signal level of the reference signal 54. In contrast, the switch control signal 56 would be low 56B whenever the value Y of the signal level of the notch duration signal 62 is greater than the value X of the signal level of the reference signal 54.

Also, as mentioned previously, the amplitude A(t) and frequency b(t) of the AC power signal may vary over time or the AC power signal 15 may be imbedded with other signals and noise. Determining when and for how long to insert the notches 18 in the AC power signal 15 may require sensing a more sophisticated relationship between the values X and Y. Consequently, the value X may need to vary over time and the DC reference signal shown in Graph B may not be appropriate for all applications. In addition, more sophisticated components may be required to sense the required relationship between the values X and Y and thus the comparator circuit U_COMPA may also not be adequate for the particular application.

In the illustrated embodiment, the predetermined relationship for creating the notches 18 requires sensing when X>Y during the positive-half cycle of the AC power signal 15. To accomplish this, the circuit segment 44 conducts the positive half-cycle of the AC power signal 15 while the switch 40 is closed. However, once the value Y of the signal level of the notch duration signal 62 is less than the value X of the signal level of the reference signal 54, the switch 40 is open and the positive half-cycle cannot conduct through either parallel circuit branch 42, 44. This extends the zero-crossings 20 of the AC power signal 15 to create the notches 18. The switch 40 is also open throughout the negative half-cycle of the AC power signal 15. However, the negative half-cycle of the AC power signal 15 is conducted through other circuit segment 42 so a notch 18 is not created on the negative half-cycle. As a result, this embodiment creates the notches 18 only on the positive half-cycles of the AC power signal 15, as shown in Graph D of FIG. 4. Generating the notches 18 on the negative half-cycle may require rearranging the notch generating circuit 32 so that the switch 40 is on the circuit segment 46. The comparator circuit U_COMPA will also need to be rearranged so that the notches 18 are created on the negative half-cycle, as discussed above.

FIG. 2 shows an alternative embodiment of the notch generating circuit 32. In this embodiment, the switch 40 closes and shorts the AC power lines 14A, 14B to create the notches 18 on the AC power signal 15. The graph in FIG. 3A illustrates the switch control signal 56 for this embodiment. The switch control signal 56 should be low 56B whenever the value Y of the signal level of the notch duration signal 62 is greater than the value X of the signal level of the reference signal 54. This maintains the switch 40 open and allows the transmission lines 14A, 14B to transmit the AC power signal 15 to the ballast. In contrast, the switch control signal 56 should be high 56A whenever the value Y of the signal level of the notch duration signal 62 is greater than the value X of the signal level of the reference signal 54. This closes the switch 40 and creates the notches 18 on the AC power signal 15. Although the switch 40 is closed during the negative half-cycle of the AC power signal 15, the biased component 49 prevents the AC power signal 15 from being shorted. Consequently, the negative half-cycle is not affected by the switch 40. The switch control signal 56 in FIG. 3A will generate the same AC power signal 15 with the notches shown in Graph D of FIG. 4. Controlling the time duration 22 of the notches 18 is thus a matter of adjusting the value X of the signal level of the reference signal 54.

Next, referring to FIGS. 3, 3A and 4, determining when and for how long to place the notches 18 on the AC power signal 15 may require sensing a more sophisticated predetermined relationship between X and Y. The switch control circuit 36 however may perform virtually the same steps to open and close the switch 40. Instead of greater or less than relationships however, the switch control circuit 36 opens or closes the switch 40 to allow the transmission lines 14A, 14B to transmit the AC power signal 15 so long as the conditions of the predetermined relationship are not met. Once the conditions are met, the switch control circuit 56 can open or close the switch 40 and create the notches 18. Many different types of arrangements and components are available to determine different types of relationships between signals. This disclosure is not limited to any type of predetermined relationship between the value X of the signal level of the reference signal 54 and the value Y of the signal level of the notch duration signal 62. Detecting different types of relationships may be required depending on the characteristics of the AC power signal 15. The above mentioned embodiments are simply used as examples and should not limit the scope of this invention.

Referring now to FIGS. 5 and 6, the components and operation of one embodiment of the dimming interface 24 are shown and described. In the illustrated embodiment, the AC power signal 15 with the notches 18 shown in Graph A of FIG. 6 is received by the full bridge rectifier 70. The full bridge rectifier 70 rectifies the AC power signal 15 into the rectified AC power signal 75 shown in Graph B of FIG. 6. An input terminal 72 on the dimming interface 24 receives a dimming interface input signal 74. The dimming interface input signal 74 is associated with the AC power signal 15 and in this case is related to the rectified AC power signal 75.

However, the rectified AC power signal 75 may have a signal level that is too high for the components of the dimming interface 24. A voltage regulation circuit 76 may be coupled between the input terminal 72 and a notch detection signal terminal 78. The voltage regulation circuit 76 regulates a peak level 71 of the dimming interface input signal 74. As illustrated in Graph C of FIG. 6, any part of the dimming interface input signal 74 that is greater than the peak level 71 is clipped by the voltage regulation circuit 76.

The voltage regulation circuit 76 may have a voltage divider which consists of resistors R5 and R7 to step down the signal level of the rectified AC power signal 72. To assure that the dimming interface input signal 74 stays below peak level 71, the voltage regulation circuit 76 has a Zener diode D9 that conducts whenever the dimming interface input signal 74 is greater than the peak level 71.

A pulse generation circuit 80 receives this dimming interface input signal 74, shown in Graph C of FIG. 6, at the notch detection signal terminal 78 and utilizes the dimming interface input signal 74 to generate a periodic pulse signal 82, shown in Graph D of FIG. 6, having pulses 84 with a pulse duration 86 related to a time duration 22 of the notches 18. To accomplish this, the pulse generation circuit 80 may detect the notches 18 in the AC power signal 15. In the illustrated embodiment, the pulse generation circuit 80 has a comparator circuit U_OPA1A. The dimming interface input signal 74 also receives a reference signal 88 at a reference signal input terminal 90. As shown in Graph C of FIG. 6, the reference signal 90 is a DC signal having a signal level with the value B. The signal level of the notch interface input signal 74 is represented by the value A.

The pulse generation circuit 80 generates a pulse 84 so long as the signal level of the dimming interface input signal 74 has a predetermined relationship with the signal level of the reference signal 90. In this case, the comparator circuit U_OPA1A generates a pulse 84 so long as the value A<B. Since the time duration 22 of the notches 18 is directly related to the amount of time that A<B, the pulse duration 86 is related to the time duration 22 of the notches 18. As mentioned above, the amplitude and frequency of the AC power signal 15 may vary according to the application. Consequently, detecting the notches 18 may involve sensing a more sophisticated relationship between A and B.

The pulse generation circuit 80 may perform virtually the same steps to detect the notches 18. Instead of greater or less than relationships, however, the pulse generation circuit 80 generates a pulse 84 so long as the conditions of the predetermined relationship are met. Once the conditions are not met, the pulse generation circuit 80 stops transmitting the pulse 84 and the periodic pulse signal 82 returns to the base level 92. Many different arrangements and components are available to determine different types of relationships between signals. This disclosure is not limited to any type of predetermined relationship between the value A of the signal level of the reference signal 88 and the value B of the signal level of the dimming interface input signal 74. The above mentioned embodiments are simply used as examples and should not limit the scope of this invention.

Referring again to FIGS. 5 and 6, the periodic pulse signal 82 is then received by a ballast dimming level signal generation circuit 94. The ballast dimming level generation circuit 94 is functional to generate a ballast dimming level signal 96 for the electronic ballast, shown in Graph E of FIG. 6. The signal level of the ballast dimming level signal 96 is associated with a relationship between the pulse duration 86 and a period T of the periodic pulse signal 82. Consequently, the signal level of the ballast dimming level signal 96 is adjusted by increasing or decreasing the pulse duration 86 of the pulses 84. As mentioned previously, the pulse duration 86 is controlled by the time duration 22 of the notches 18. As a result, the time duration 22 of the notches 18 determines the signal level of the ballast dimming level signal 96.

In the illustrated embodiment, a ratio detection circuit 98 is operably associated with the comparator circuit U_OPA1A to receive the periodic pulse signal 82. The ratio detection circuit 98 senses a ratio between the pulse duration 86 and the period 87 of the periodic pulse signal 82. The ratio detection circuit 98 of the illustrated embodiment is an averaging circuit having the resistor R4 and a shunt capacitor C1. The shunt capacitor C1 operates as an integrator and integrates the values of the periodic pulse signal 82 over one or more periods T of the periodic pulsed signal 82. The output 100 of this ratio detection circuit 98 is directly related to the average value of the periodic pulse signal 82. Thus, the ratio detection circuit senses a ratio approximately equal to ∫Periodic_pulse signal dt/T.

While in this embodiment, the average value of the periodic pulse signal 82 is output by the ratio detection circuit 98, other ratios are within the scope of the invention. In the ratio detection circuit 98, the size of the pulse duration 86 is associated with a relationship between the pulse duration 86 and a period of the periodic pulse signal T because the average value of periodic pulse signal 82 is associated with the size of the pulse duration 86. However, any circuit that measures a relationship between the size of the pulse duration 86 and a period of the periodic pulse signal 82 is within the scope of the invention. For example, the relevant interval of the periodic pulse signal 86 may be two or more periods T or may even be a fraction of a period T. Circuits are also known in the art for measuring the amount of time that a signal is in a particular state. Thus any type of circuit capable of generating a signal associated with a relationship between the pulse duration 86 and the period T is within the scope of this invention.

In this case, the output 100 is related to the average value of the periodic pulse signal 86 and thus the output 100 is a DC signal. While this output 100 of the ratio detection circuit 98 may be utilized as the ballast dimming interface signal 96, amplifying this signal is desirable to increase the sensitivity of the control circuit 28 of the electronic ballast. The output 100 is input into one of the terminals 104 of the amplifier circuit U_OPA2A while the other terminal 106 receives a feedback from a feedback circuit segment 108 connected to the dimming interface output terminal 110. The feedback circuit segment 108 is arranged with resistors R15 and R16. The signal level of the ballast dimming level signal 96 can thus be approximated by the expression:

$$\text{Ballast\_Dimming\_Level\_Signal} = \text{Output\_of Ratio\_Detection\_Circuit} * (1 + R15/R16)$$

This ballast dimming level signal 96 may then be transmitted to the control circuit 28 of the electronic ballast. The control circuit 28 compares the signal level of the ballast dimming level signal 96 with the signal level of the feedback signal 30 from the lamp. The control circuit 28 then causes the relevant power circuit 110 to adjust the AC lamp signal 31 so that the lamp operates at the desired power level.

Thus, although there have been described particular embodiments of the present invention of a new and useful POWER LINE DIMMING CONTROLLER AND RECEIVER, it is not intended that such references be construed as limitations upon the scope of this invention except as set forth in the following claims.

What is claimed is:

1. A method of controlling a ballast dimming level for an electronic ballast, comprising:

(a) transmitting an AC power signal to the electronic ballast;

(b) generating notches on the AC power signal utilizing a power line controller by opening a switch on an AC power line transmitting the AC power signal;

(c) varying a time duration of the notches in accordance with a desired ballast dimming level by (d) receiving a notch duration signal associated with the AC power signal;

(e) producing a reference signal having an adjustable signal level;

(f) associating the time duration of the notches with an amount of time that the signal level of the notch duration signal has a predetermined relationship with the signal level of the reference signal and generating a switch control signal having a first state for opening the switch and having a second state for closing the switch, wherein the switch control signal is in the first state only during one of either the positive or negative half-cycle of the AC power signal; and (g) adjusting the signal level of the reference signal to vary the time duration of the notches so that the ballast dimming level of the electronic ballast is adjusted to the desired ballast dimming level.

2. The method of claim 1, wherein the notches are generated on the AC power signal only during one of either positive or negative half-cycles of the AC power signal.

3. The method of claim 1, wherein the notches are generated at or near zero-crossings of the AC power signal.

4. The method of claim 3, wherein the zero-crossings are on one of either the positive or negative half-cycles of the AC power signal.

5. The method of claim 1, wherein the notches are generated when the signal level of the notch duration signal has the predetermined relationship with the signal level of the reference signal.

6. The method of claim 1, wherein the switch control signal is in the first state only at or near a zero-crossing of the AC power signal.

7. The method of claim 1, wherein step of receiving a notch duration signal associated with the AC power signal further comprises maintaining that the notch duration signal at or below a peak level.

8. A power line controller for controlling a ballast dimming level for an electronic ballast that is coupled to AC power lines transmitting an AC power signal, the power line controller comprising:

a notch generating circuit having a switch, the notch generating circuit being connectable to at least one of the AC power lines so that one of either opening or closing the switch creates notches on the AC power signal and wherein a time duration of the notches is related to the ballast dimming level of the electronic ballast;

a reference signal circuit operable to generate an adjustable reference signal;

a switch control circuit operably associated with the switch, the switch control circuit including a reference signal input terminal for receiving the reference signal and a notch duration input terminal for receiving a notch duration signal associated with the AC power signal, the switch control circuit being operable to control the time duration of the notches in accordance with an amount of time that a signal level of the notch duration signal has a predetermined relationship with a level of the reference signal and whereby adjusting the level of the reference signal varies the time duration of the notches to control the ballast dimming level of the electronic ballast; and wherein the notch generating circuit further comprises a first circuit segment having a first biased component for transmitting one of either a positive or negative half-cycle of the AC power signal and the switch, the switch being connected on the first circuit segment so that opening the switch creates the notches on the one of either a positive or negative half-cycle of the AC power signal when the notch generating circuit is connected to the AC power line, and a second circuit segment having a second biased component for transmitting the other half-cycle of the AC power signal.

9. The power line controller of claim 8, wherein the notch generating circuit is connectable to the at least one of the AC power lines so that opening the switch creates notches on the AC power signal.

10. The power line controller of claim 8, wherein the first circuit segment and the second circuit segment are connected in parallel.

11. The power line controller of claim 8, wherein the reference signal circuit comprises a variable DC source.

12. The power line controller of claim 8, wherein the reference signal circuit comprises a variable resistor and a DC source.

13. The power line controller of claim 8, wherein the switch control circuit further comprises:

a switch control signal input terminal connectable to at least one of the AC power lines; and a voltage regulation circuit coupled between the switch control input terminal and the notch duration input terminal, the voltage regulation circuit effective to regulate a peak level of the notch duration signal.

14. The power line controller of claim 13, wherein the voltage regulation circuit comprises a reverse-biased Zener diode.

15. The power line controller of claim 8, wherein the predetermined relationship between the signal level of the notch duration signal and the level of the reference signal is whether the signal level of the notch duration is at or below the level of the reference signal.

16. The power line controller of claim 8, wherein the switch control circuit is operable to generate a switch control signal for opening and closing the switch.

17. The power line controller of claim 8, wherein the switch control circuit comprises a comparator operable to detect when the signal level of the notch duration signal and the level of the reference signal have the predetermined relationship.

* * * * *